United States Patent [19]

Beddall et al.

[11] 4,285,428
[45] Aug. 25, 1981

[54] RAZOR CARTRIDGE DISPENSER

[75] Inventors: Edward A. Beddall, Fairfield; Bryan J. Goddard, North Branford, both of Conn.

[73] Assignee: Warner-Lambert Company, Morris Plains, N.J.

[21] Appl. No.: 875,651

[22] Filed: Feb. 6, 1978

Related U.S. Application Data

[63] Continuation of Ser. No. 718,258, Aug. 27, 1976, abandoned.

[51] Int. Cl.³ ............................................ B65D 83/10
[52] U.S. Cl. .................................................. 206/354
[58] Field of Search ............... 206/352, 353, 354, 355, 206/356, 491, 628, 606

[56] References Cited

U.S. PATENT DOCUMENTS

| 2,490,133 | 12/1949 | Inman | 206/606 |
| 2,955,736 | 10/1960 | Annen, Sr. | 229/51 TS X |
| 3,224,633 | 12/1965 | Allen | 206/606 X |
| 3,394,865 | 7/1968 | Leblanc | 221/69 X |
| 3,533,874 | 10/1970 | Elias | 276/498 X |
| 3,945,557 | 3/1976 | Graham, Jr. | 229/27 X |
| 3,970,194 | 7/1976 | Iten | 206/356 X |

Primary Examiner—Donald F. Norton
Attorney, Agent, or Firm—J. J. Duggan; L. S. Gillow; R. S. Strickler

[57] ABSTRACT

A folded biodegradable cardboard dispenser for razor cartridges. The dispenser has a series of compartments each provided with a tear strip for selectively uncovering the loading channel and one end of a disposable razor cartridge packaged therein.

9 Claims, 9 Drawing Figures

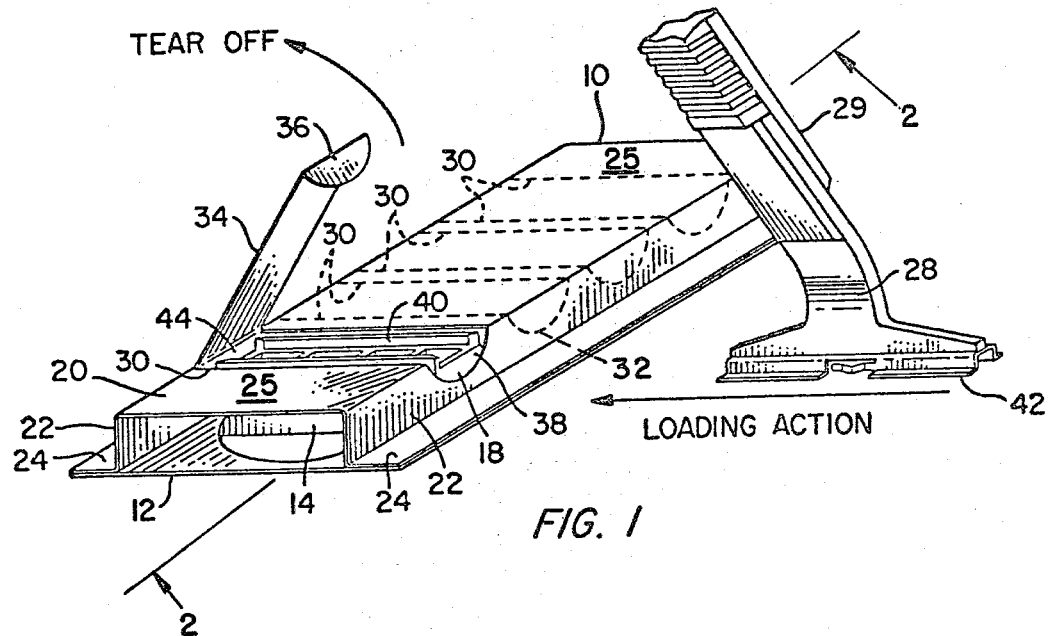
FIG. 1
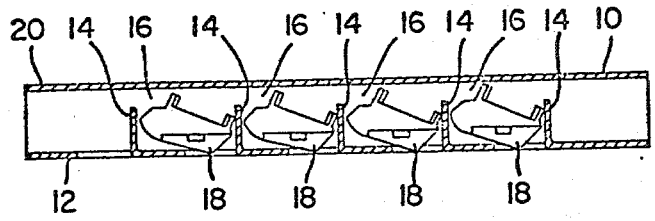
FIG. 2
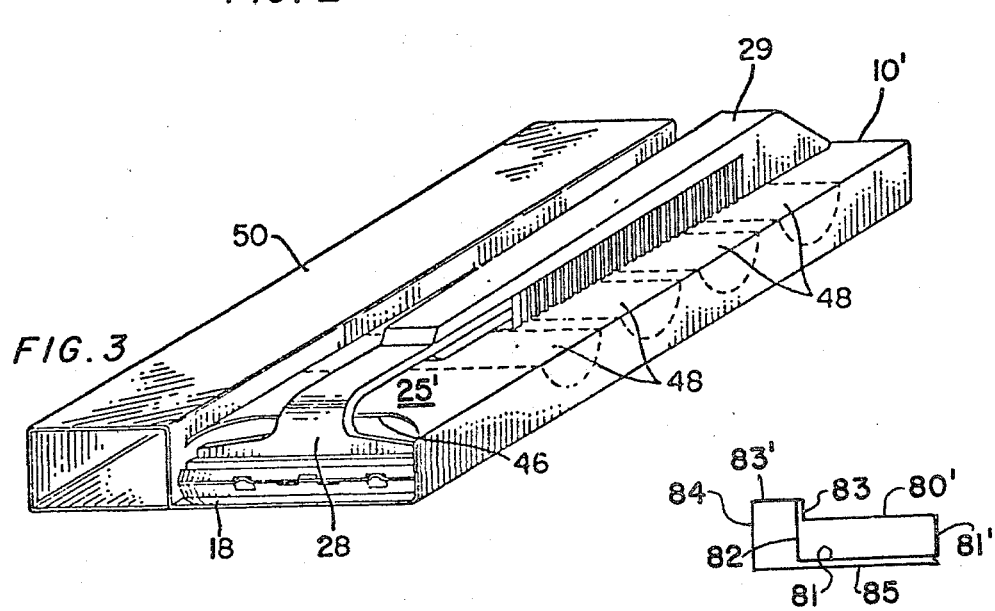

RAZOR CARTRIDGE DISPENSER

This is a continuation of application Ser. No. 718,258 filed Aug. 27, 1976, now abandoned.

BACKGROUND OF THE INVENTION

1. Field of the Invention

Shaving equipment packaging with particular reference to shipping and dispensing packages for bonded razor cartridges.

2. Description of the Prior Art

A form of shaving device currently being marketed comprises a disposable bonded razor blade cartridge having a channel along one of its sides into which a reusable main frame and handle is loaded to complete the device. Spent cartridges are removed from the main frame and replaced by factory fresh units.

Customarily, replacement cartridges are sold in quantities of four or more packaged in a shipping container from which they may be dispensed as needed. Heretofore, however, they have been packaged in plastic containers having the drawbacks of being relatively difficult and costly to manufacture, largely non-degradable and contributory to environmental contamination.

An object of the present invention is to overcome the aforesaid and related drawbacks of plastic packaging and to provide for greater ease and economy in the operations of packaging razor cartridges as well as greater facility in dispensing the cartridge at the consumer end.

SUMMARY OF THE INVENTION

The foregoing object and corollaries thereof are accomplished by packaging bonded razor cartridges in folded cardboard dispensers. The dispensers contemplated comprise a series of compartments each with a tear strip for selectively uncovering the loading channel and one end of a cartridge packaged therein. The side of the compartment opposite to the exposed end of the packaged cartridge may be used as a stop for holding the cartridge in place during loading onto a razor main frame and handle.

The dispenser compartments may be juxtaposed or superposed with dividers or partitions therebetween formed of tabs struck and folded inwardly from one or more sides of the package.

The tear strips are formed by spaced lines of perforations which, until broken for cartridge dispensing, maintain secure closure of the compartments during shipping, display and other handling whereby the consumer can be assured of factory freshness of the product.

Free ends of the tear strips are arranged to expose one end respectively of a packaged razor cartridge when these ends are stripped away from the package. In the contemplated arrangement of juxtapositioned compartments, the strip may be further torn across the channeled side of the packaged razor cartridge to permit its loading onto a razor main frame and handle. In the arrangement of superposed compartments, loading can immediately follow exposure of the one end of the cartridge while the remaining opposite side of the tear strip functions as the aforementioned stop to facilitate the loading operation. Thereafter, complete removal of this tear strip will expose the loading channel of the next cartridge.

Spent dispensers, being diodegradable, can be disposed of without contamination of the environment.

Details of the invention will become more readily apparent from the following description when taken in conjunction with the accompanying drawings.

IN THE DRAWINGS

FIG. 1 is an illustration, in perspective of one embodiment of the invention;

FIG. 2 is a cross-sectional view of the dispenser of FIG. 1 taken generally along line 2—2 looking in the direction of the arrows;

FIG. 3 is an illustration, in perspective, of a modification of the dispenser illustrated in FIGS. 1 and 2;

FIG. 3a is a schematic end view of the dispenser of FIG. 3 with the razor removed and showing the relationship among panels;

DESCRIPTION OF THE PREFERRED EMBODIMENTS

Figure 4:
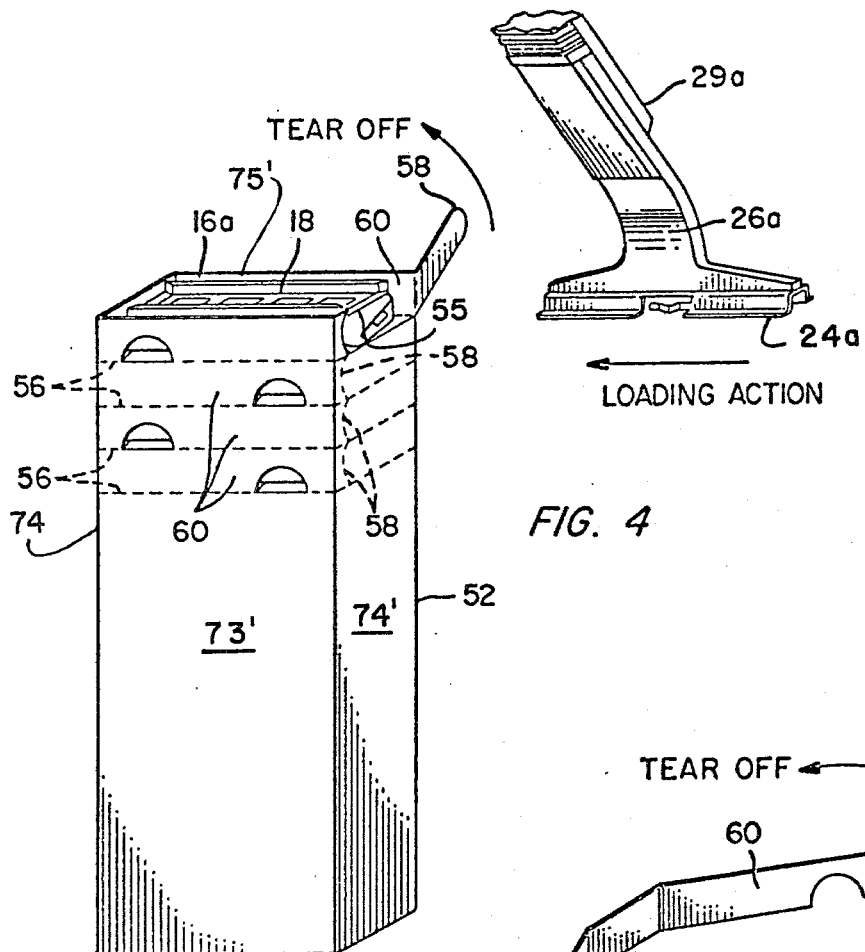
FIG. 4 illustrates, also in perspective, another form of razor cartridge dispenser contemplated by the invention.

Referring more particularly to FIGS. 1 and 2 wherein there is illustrated a preferred embodiment of the invention, dispenser 10 is formed entirely of folded cardboard, e.g., a 0.020 inch thickness of bleached board. The dispenser comprises a flat base member wall 12 having an aligned series of partitions 14 which form compartments 16 therebetween and into each of which a razor cartridge 18 may be placed for shipping, sale and consumer dispensing. Partitions 14 each comprise a tab struck from the material of base member wall 12 and bent, to the right angular disposition illustrated in FIG. 2.

With razor cartridges 18 positioned in compartment 16, an inverted U-shaped cover member 20 completes the generally rectangular configuration of dispenser 10. Cover member 20 is right-angularly double folded lengthwise along its edges to form median wall 25 opposite sides 22 and margins 24, the latter being cemented or otherwise connected to base member wall 12 as shown in FIG. 1.

Cover member 20 extends over partitions 14 capturing razor cartridges 18 placed in compartments 16. Partitions 14 (FIG. 2) extend only partially across the space between base member wall 12 and cover member 20 interiorly of the tubular structure of dispenser 10. They may, however, be designed to make contact with and be cemented to cover member 20 or extended into slots (not shown) in cover member 20, i.e., in eggcrate fashion.

While it has been mentioned hereinabove that base member wall 12 and cover member 20 complete the structure of dispenser 10, it should be appreciated that its opposite open ends may be closed with folded extensions of base member wall 12 (not shown) and/or paper coverings. Also, base member wall 12 may be covered, e.g., with a paper label, to present the entry of dust or other contaminants into dispenser 10 during shipment and before use of razor cartridges 18. Alternatively, the dispenser may be boxed for shipment.

In rendering cartridges 18 individually adaptable to loading onto a reusable razor main frame 26 having handle 28 (FIG. 1), cover member 20 is perforated along pairs of lines 30 which are each interconnected by a semi-circular line 32 extending downwardly over a portion of one of sides 22 of cover member 20. The sections of cover member 20 bounded by each pair of perforated lines 30 and respective interconnecting lines 32 comprise tear strips 34. The terminal semi-circular portions 36 of each tear strip 34 may be broken away by punching same inwardly with the thumbnail or finger. This provides a grip for tearing the remainder of the strip along lines 30.

By so tearing a strip 34 and lifting same as shown in FIG. 1, an end 38 and the loading channel 40 of a razor cartridge 18 may be exposed for loading onto a reusable razor main frame and handle. For example, slide 42 of razor main frame 28 (FIG. 1) may be entered into channel 40 of cartridge 18 with wall 44 of compartment 16 functioning as a stop for holding the cartridge in place during the loading operation. The thus loaded cartridge 18 may be lifted by handle 29 out of dispenser 10 and put to use. The used tear strip 34 can be broken away from dispenser 10 and discarded or pushed downwardly into empty cavity 16 to an out-of-the-way position.

Following the removal of the last razor cartridge 18, cardboard dispenser 10 can be disposed of without concern for contamination of the environment.

While dispenser 10 has been described hereinabove as being formed of two pieces of material, i.e., base member wall 12 and cover member 20, it should be understood that bottom 12 may be formed as an extension of one edge of cover member 20 and folded 180° into place.

As illustrated in FIG. 3, dispenser 10 may be modified to include a cutback 46 at one end in median wall 25 for receiving a razor main frame 28 loaded with a razor cartridge 18. By extending handle 29 of the loaded main frame across strips 48 of dispenser 10', the complete unit of a ready-for-use shaving instrument with replacement razor cartridges can be shipped, displayed and sold in a single package. Stiffening of the package can be accomplished by forming along one side thereof a folded tubular extension 50.

Figure 5:
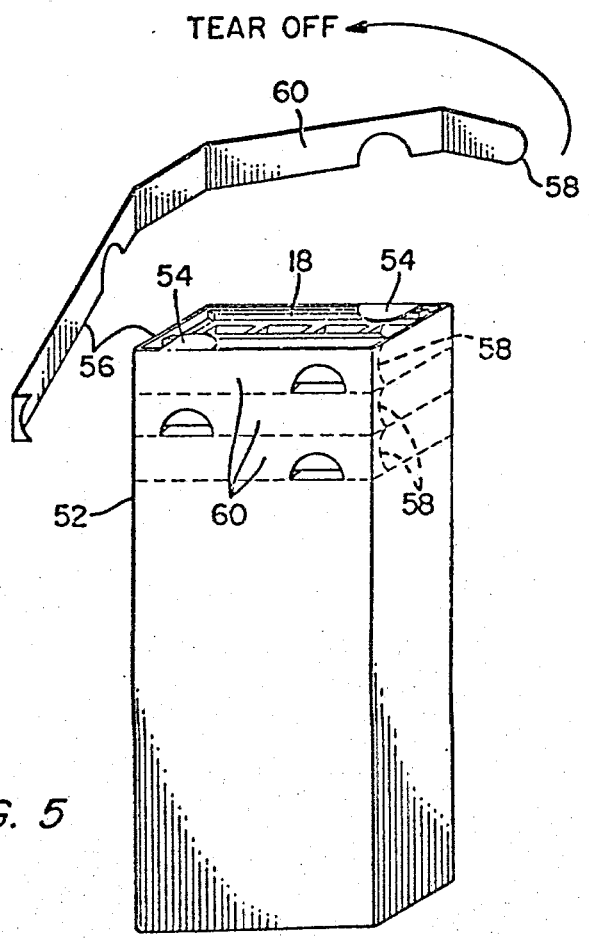
FIG. 5 depicts the dispenser of FIG. 4 in a condition following first use.

In FIGS. 4 and 5 there is illustrated a further modification of the invention wherein razor cartridge compartments 16a are formed in a superposed or stacked relationship. This is accomplished by constructing dispenser 52 of cardboard foled into a rectangular tubular configuration substantially as shown in FIGS. 4 and 5. The container, indicated generally by the reference numeral 52, includes base member wall 73', median wall 75' and opposed side walls 74 and 74'. A preselected number of razor cartridge-supporting compartments 16a are formed therein by means of inwardly folded tabs 54 (FIG. 5) which are struck from sides of the dispenser 52. In the embodiment illustrated, successive compartments 16a are separated by two such tabs which function as partitions between razor cartridges 18. Similar tabs are extended over the outermost surfaces of the first and last cartridge 18 in the dispenser to fix the first and last cartridges in place.

Between adjoining compartments 16a the walls of dispenser 52 are perforated completely circumferentially along lines 56 with added interconnecting lines 58. Tear strips 60 having opposite ends produced by lines 58 are thus provided to facilitate the loading of razor cartridges 18 upon a reusable razor main frame 26a.

Referring more particularly to FIG. 4, it can be seen that by breaking away one of tear strips 60 along arcuate line 58 and stripping the adjacent portion thereof, a razor cartridge end 55 becomes exposed for loading onto a razor main frame 24a. Loading may be accomplished in the manner already described relative to the loading of main frame 28 of FIG. 1. In this instance, however, the still intact opposite side of tear strip 60 can function as a stop for holding razor cartridge 18 in place during the loading operation.

Following loading and removal of cartridge 18 together with main frame 26a by lifting the unit from dispenser 52, remaining portions of tear strip 60 around the now vacant compartment 16a are completely torn from dispenser 52 as illustrated in FIG. 5 and discarded. This renders the dispenser in condition for a repeat of the above-described procedure when dispensing of the next cartridge 18 is desired, and so on.

Figure 6:
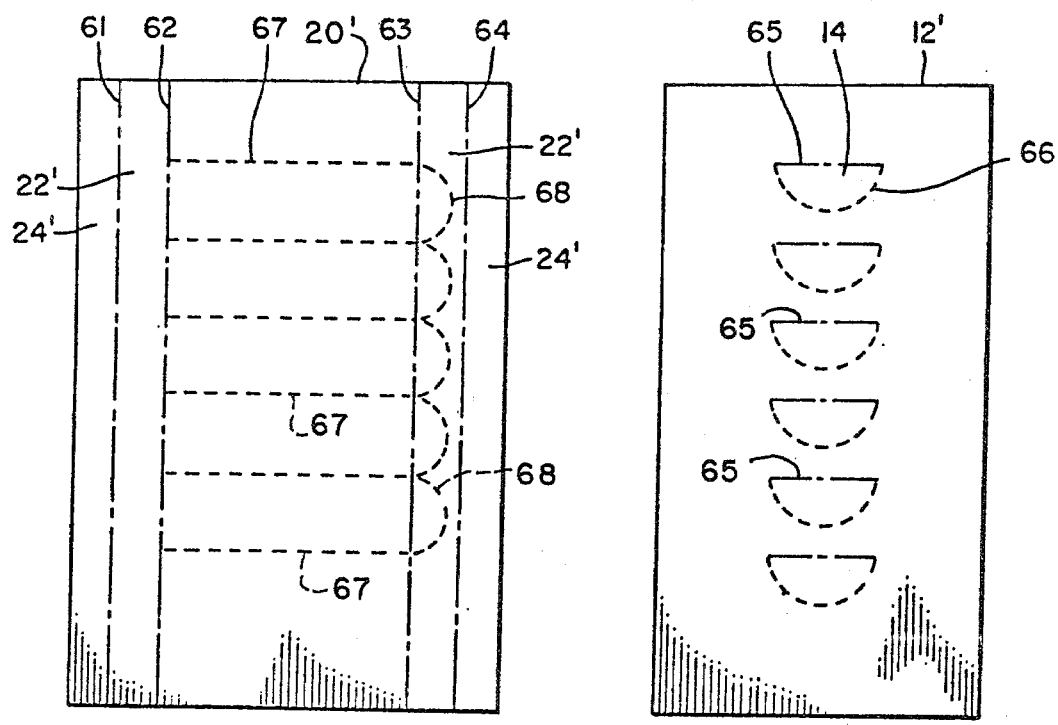
FIG. 6 is a plan view of the blanks for forming the container of FIG. 1.

Referring to FIG. 6, container 10 is formed from two cardboard blanks of substantially rectangular geometry. A first blank 20' corresponds to U-shaped cover 20 of FIG. 1. Blank 20' has a longitudinally extending top panel section demarcated on either side by fold lines 62 and 63. Contiguous with these lines are side panels 22' corresponding to side panels 22 of FIG. 1. These side panels are demarcated from flange panels 24' by fold lines 61 and 64. Flange panels 24' correspond to the margins 24 of FIG. 1. Fold lines 62 and 63 are embossed into blank 20' in such fashion as to favor a right angle bend of panels 22' down from the top panel surface while fold lines 61 and 64 favor a similar but opposite right angle bend of flange panels 24'. When folded into final configuration, blank 20' assumes the U-shaped configuration of cover member 20.

A plurality of perforation lines 67 are arrayed transversely across the top panel of sheet 20' and are evenly spaced apart to a predetermined dimension set in accordance with the size of shaving cartridge 18. Each perforation line 67 is joined at its extreme end by arcuate perforation lines 68 to the same extreme end of the next succeeding line. Hence a tear strip is formed, the removal of which provides access to cartridge 18. Perforation lines 67 terminate on fold line 62; if complete removal of the tear strip is desired, the portion of fold line 62 included within perforation lines 67 may also be perforated. The number of perforated lines 67 correspond to the number of products to be arrayed internally of container 10.

Blank 12', another substantially rectangular cardboard member, corresponds to base member wall 12 of container 10 shown in FIG. 1. The complementary margin portions of blank 12' are affixed to flange members 24' in the final assembly of container 10. A plurality of fold lines 65 are longitudinally arrayed down the center of blank 12' which when assembled to blank 20' are in substantial registration with perforation lines 67. The ends of fold lines 65 are joined by arcuate perforation lines 66, thereby forming tab members 14. Upon final assembly, tabs 14 are broken free and extended internally of container 10 forming partitions or walls between the products.

Figure 7:
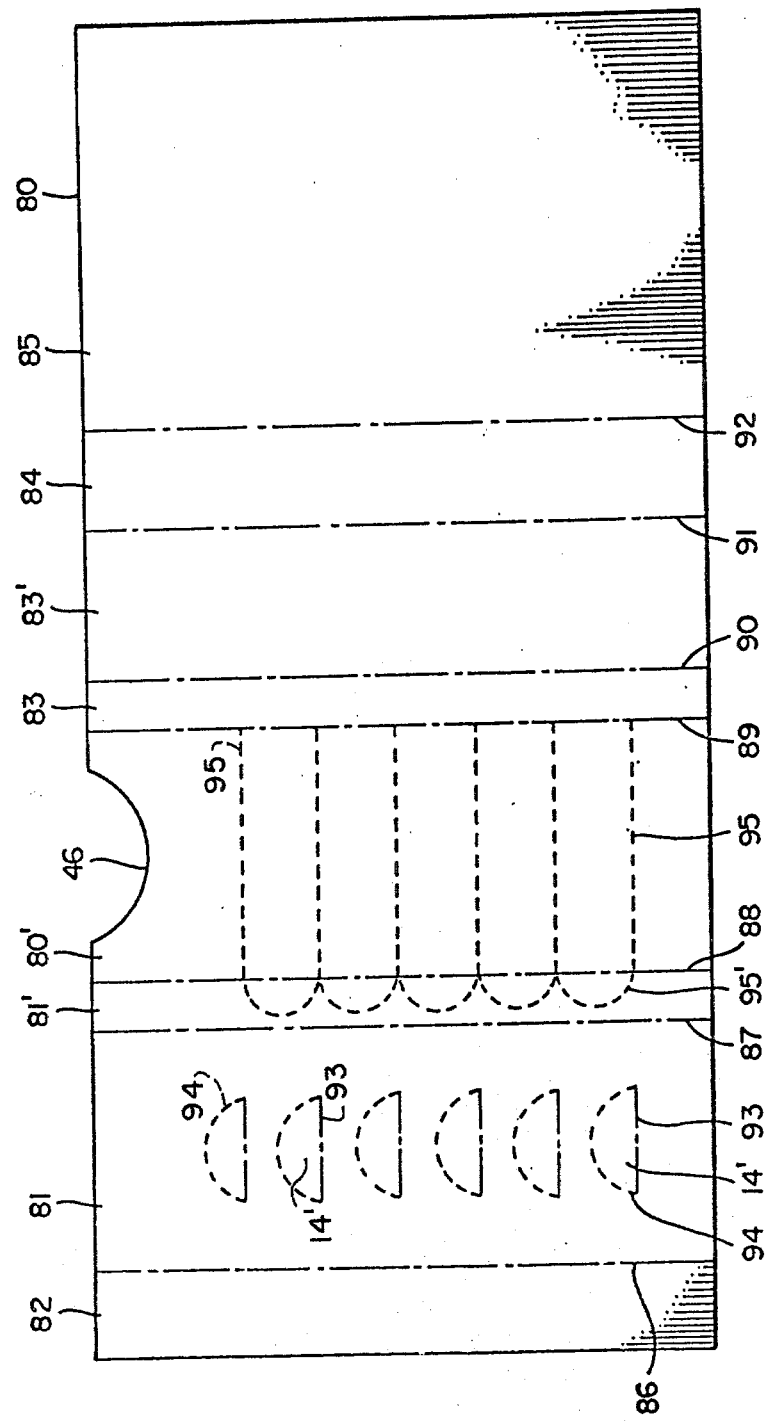
FIG. 7 is a plan view of the blank for forming the container of FIG. 3.

FIG. 7 shows a unitary cardboard blank from which container 10' of FIG. 3 may be formed by folding equipment well known to those of ordinary skill in the art. Blank 80 is of rectangular shape and viewing it from left to right, it comprises a first side panel 82 demarcated by fold line 86, which line extends parallel to a first side margin. Contiguous with first side panel 82 is bottom panel 81 which is separated from second side panel 81' by fold line 87. First top panel 80' is demarcated from second side panel 81' by third fold line 88 on one side and from third side panel 83 by fold line 89 on the other. Across the remainder of blank 80 are second top panel 83', fourth side panel 84, and support panel 85 separated one from the other by fold lines 91 and 92, respectively.

As is the case of top panel 20' of FIG. 6, top panel 80' contains a plurality of perforation lines 95 joined by arcuate perforation lines 95' extending into second side panel 81', thereby forming tear strips to provide access to the product. Base panel 81, similar to base panel 12' of FIG. 6, contains a plurality of fold lines 93 joined by perforation lines 94 to form a plurality of tabs 14', fold lines 93 and perforation lines 95 being co-linear. The fold lines are embossed or scored into blank 80 to favor bending or folding in accordance with the following: Base panel 81 is folded 90° counterclockwise to first side panel 82, second side panel 81' is then folded 90° counterclockwise to base panel 81, the first top panel 80' is similarly folded 90° counterclockwise to second side panel 81'. Third side panel 83 is folded 90° clockwise to first top panel 80', which results in, due to the increased width of the first side panel 82 over that of second and third side panels 81' and 83, an overlapping of third side panel 83 with a portion of first side panel 82. After affixing of the overlapping portions, second top panel 83', the fourth side panel 84, and the supporting panel 85 are each folded 90° counterclockwise to the other, resulting in the far margin of support panel 85 being brought into registration with the base panel 81 of blank 80. Prior to the overlapping portions of support panel 85 and base panel 81 being affixed, tabs 14' are bent inwardly to form walls or partitions between the products. Hence in the use of this container the products must be serially arrayed internally of container 10' and tabs 14' set prior to the completion of assembly. An arcuate cutaway 46 is provided along the top margin of panel 80' to provide means for attaching a razor handle and main frame thereto.

Figure 8:
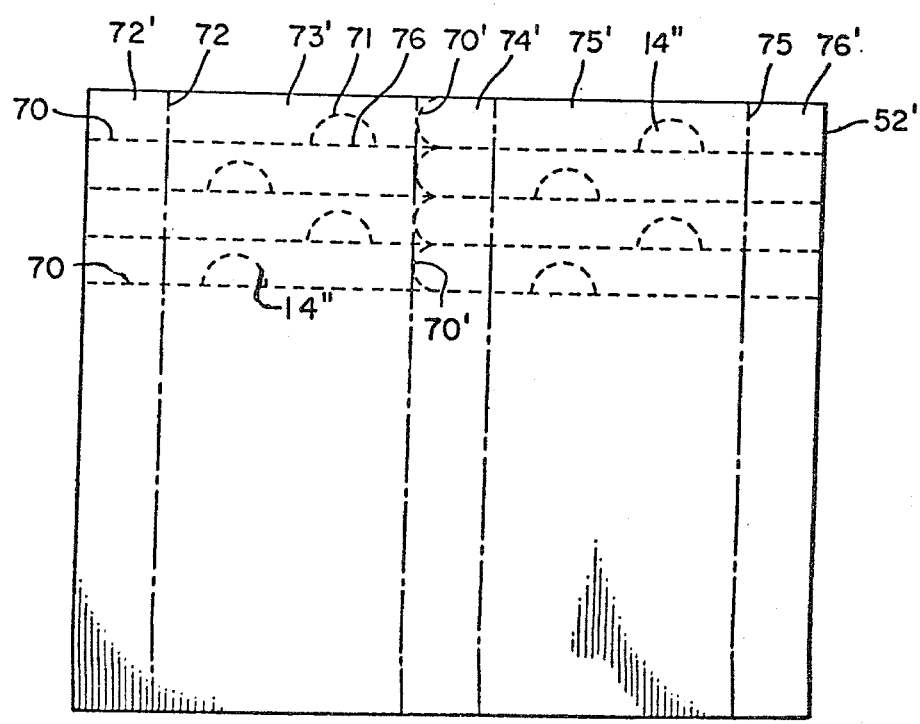
FIG. 8 is a plan view of a blank for forming the container of FIG. 4.

Referring to FIG. 8, there is shown a cardboard blank 52' of substantially rectangular geometry which is used to form container 52 of FIG. 4. First side panel 72' is contiguous with first wall panel 73' and is separate therefrom by fold line 72. Second side panel 74' is contiguous with first wall panel 73' and joined thereto by second fold line 73. Second wall panel 75' is joined to third side wall 76' by fourth fold line 75, both of which are joined to second side wall 74' along third fold line 74. Transversely arrayed across the entire width of blank 52' are a plurality of lines 70 perforated substantially along their entire length. At the same point along their length, each line 70 is joined to the next succeeding line 70 by arcuate perforations 70', the last line 70 being joined to the top margin of blank 52'. Preferably arcuate perforations 70' are located in second side wall 74' but may be located at any other locations if such is found advantageous. Each of the portions of blank 52 defined by perforation lines 70 and 70' form tear strips, the removal of which are used to provide access to the shaving cartridges contained internally of container 52. Portions 76 of lines 70 constitute fold lines rather than perforations forming tabs 14" when connected at their ends by joining perforations 71. Preferably each line 70 contains two alternately spaced tabs 14" each located on first wall 73' and second wall 75', respectively.

In assembling container 52, first wall panel 73' is bent at a right angle to first side panel 72' and each succeeding panel is bent another 90° resulting in the overlapping of first side panel 72' and third side panel 76'. The affixing of these overlapping portions results in completion of assembly of container 52. As each shaving cartridge is inserted internally of container 52, tabs 14" associated with the position of the shaving cartridge are bent inwardly to form walls or partitions. Removal of the tear strips provides successive access to the serially arrayed products contained within.

Those skilled in the art will readily appreciate that there are various other modifications and adaptations of the precise forms of the invention here shown which may suit particular requirements. Accordingly, the foregoing illustrations are not to be interpreted as restrictive of the invention beyond that necessitated by the following claims.

We claim:

1. A cardboard dispenser for razor cartridges of a type having coupling means for engagement with a razor handle having complementary coupling means comprising a substantially rectangular tubular container having a succession of partitioned compartments within, each of the compartments dimensioned to receive and support the entirety of one of the razor cartridges, the container including an integral cover member having a median wall and two depending side walls, a base member wall affixed to the side walls having a plurality of tabs struck therefrom and extending interiorly of the container for partitioning the compartments, and a plurality of tear strips integral with the cover member normally covering at least a portion of the median wall and one of the contiguous side walls of each of the compartments, the tear strips being manually removable to provide access to the coupling means on the cartridges, thereby providing for removal of the cartridges from the container after engagement with the razor.

2. A dispenser according to claim 1 wherein the compartments are juxtaposed and the removal of the tear strip serves to expose and provide access to the coupling means and a portion of one end of the cartridge, and the base member is a separate member having face engagement with flap members extending from the side walls.

3. A dispenser according to claim 1 wherein the container includes means along at least one of its sides for reinforcing the dispenser.

4. A dispenser according to claim 1 wherein the container adjacent one of its ends is provided with a cutback in the median wall for adapting the container to receive one of the cartridges engaged to a razor handle, the razor handle being positioned across the longitudinal axes of the compartments for unitary packaging of the razor handle and cartridges.

5. A container assembly for dispensing products comprising:

a first blank of substantially rectangular geometry having a top panel, two equal side panels each contiguous with a side of the top panel, and two flange panels each contiguous with a side of each side panel, the panels bein demarcated by an embossed fold line along their contiguous sides; and a plurality of equal spaced perforation lines arrayed transversely of the top panel and orthogonally to the contiguous sides, each perforation line at the same one end connecting to the next successive perforation line by a joining perforation line extending into a side panel thereby forming a plurality of tear strips; and a second blank of substantially rectangular geometry having a plurality of embossed fold lines spaced equally from each other and in substantial registration with the perforation lines of the first blank, each of the fold lines having its ends connected by a second joining perforation line forming tabs; the container being formed by the second blank being affixed to the flange panels of the first blank after the side panels are folded at right angles to the top and the flange panels at right angles to the side panels parallel to the top panel, the tabs being bent inwardly to the container to form partitions to separate the products when serially arrayed internally of the container, and the tear strips being adapted upon removal to provide access to the products.

6. A container blank comprising:

a flat sheet of compliant material having substantially rectangular geometry, a first side panel demarcated by a first fold running parallel to a margin of the sheet, a first wall panel demarcated by a second fold line running parallel to the margin, a second side panel demarcated by a third fold line parallel to the margin, a second wall panel demarcated by a fourth fold line parallel to the margin, a third side wall demarcated by a second margin parallel to the margin, each of the panels contiguous with the next preceding panel; a plurality of lines perforated along substantially their entire length transversely arrayed across the entire width of the sheet and substantially orthogonal to the panel fold lines, each perforated line substantially evenly spaced from the next succeeding line and connected one to the other at substantially the same point on their length by a plurality of joining perforation lines, the last perforated line nearest a transverse margin of the sheet being joined thereto by a perforated line at the same point on its length, each set of perforated lines thereby forming a tear strip; and at least a portion of the length of each substantially perforated line defining a fold line, the fold line portion being joined at its ends by a perforated line forming a tab; which blank may form a container when each panel is folded substantially at right angles to the preceding panel with the first and third side panels affixed one to the other, the tabs formed by the folded line portions of the transversely arrayed perforated lines broken inwardly to form partition walls for separating products when serially arrayed internally of the container, the removal of each tear strip providing access to the next succeeding product.

7. A cardboard dispenser for razor cartridges of a type having coupling means for engagement with a razor handle having complementary coupling means comprising a substantially rectangular tubular container having a succession of partitioned compartments superposed within the container, each of the compartments being dimensioned to receive and support a complete razor cartridge, the container including an integral cover member defining a base member wall, a median wall and opposed side walls connecting the base member wall and the median wall, said cover member having a plurality of tabs struck therefrom and extending into the interior of the container for partitioning the container into compartments, and a plurality of tear strips formed in the cover member and extending peripherally about the cover member whereby sequential removal of said tear strips from said cover member provides sequential access to said cartridges.

8. A dispenser according to claim 7 wherein the superposed compartments are partitioned by tabs struck and bent inwardly from at least the median wall and the base member wall of the container.

9. A dispenser according to claim 8 wherein the tabs are integral extensions of the tear strips.

* * * * *